(12) United States Patent
Yoshida et al.

(10) Patent No.: US 8,852,317 B2
(45) Date of Patent: Oct. 7, 2014

(54) METHOD FOR RECOVERING TANTALUM (75) Inventors: Mami Yoshida, Ageo (JP); Kenji Matsuzaki, Ageo (JP); Tatsuya Aoki, Ageo (JP); Rintaro Ishii, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 108 days.

(21) Appl. No.: 13/635,890

(22) PCT Filed: Mar. 24, 2011

(86) PCT No.: PCT/JP2011/057119
§ 371 (c)(1),
(2), (4) Date: Sep. 18, 2012

(87) PCT Pub. No.: WO2011/125510
PCT Pub. Date: Oct. 13, 2011

(65) Prior Publication Data
US 2013/0014611 A1    Jan. 17, 2013

(30) Foreign Application Priority Data

Apr. 1, 2010 (JP) ................. 2010-084726

(51) Int. Cl.
| | | |
|---|---|---|
| C22B 34/24 | (2006.01) | |
| C22B 3/12 | (2006.01) | |
| C22B 7/00 | (2006.01) | |
| C22B 3/10 | (2006.01) | |
| C22B 3/06 | (2006.01) | |

(52) U.S. Cl.
CPC . *C22B 34/24* (2013.01); *C22B 3/12* (2013.01); *C22B 7/006* (2013.01); *C22B 3/10* (2013.01); *C22B 3/06* (2013.01)
USPC ............................................. 75/711; 148/514

(58) Field of Classification Search
CPC .............. C22B 3/06; C22B 3/10; C22B 3/12; C22B 34/24
USPC ............................................................ 75/711
See application file for complete search history.

(56) References Cited

U.S. PATENT DOCUMENTS 3,647,420 A * 3/1972 Restelli ......................... 75/622
4,988,487 A * 1/1991 Lai et al. ..................... 423/21.5

(Continued)

FOREIGN PATENT DOCUMENTS

| JP | 53-1104 | 1/1978 |
| JP | 64-75632 | 3/1989 |

(Continued)

OTHER PUBLICATIONS

Machine translation of JP 2000-007338 published Jan. 11, 2000.*

(Continued)

*Primary Examiner* — George Wyszomierski
*Assistant Examiner* — Tima M McGuthry Banks
(74) *Attorney, Agent, or Firm* — Roberts & Roberts, LLP (57) ABSTRACT

The present invention provides a technology for recovering high-content tantalum from tantalum-containing waste with reducing various impurities such as antimony (Sb) and phosphorus (P) which hinder reuse of the tantalum in tantalum capacitors. The method for recovering tantalum from tantalum-containing waste according to the present invention is characterized in that tantalum-containing waste is subjected to an acid treatment and then to an alkali treatment, thereby recovering tantalum. The acid treatment is preferably performed with use of an acid containing hydrochloric acid and the alkali treatment is preferably performed with use of sodium hydroxide or potassium hydroxide. The tantalum-containing waste in the present invention is preferably a tantalum sintered compact collected from a tantalum capacitor.

11 Claims, 1 Drawing Sheet

(56) References Cited

U.S. PATENT DOCUMENTS

| | | | |
|---|---|---|---|
| 6,955,938 B2 * | 10/2005 | Rosenberg et al. | 438/77 |
| 7,981,191 B2 * | 7/2011 | Smokovich et al. | 75/356 |

FOREIGN PATENT DOCUMENTS

| | | |
|---|---|---|
| JP | 2000-007338 | 1/2000 |
| JP | 2002-327221 | 11/2002 |
| JP | 2002363662 A * | 12/2002 ............ C22B 34/24 |
| JP | 2004-002927 | 1/2004 |
| JP | 2007277091 A * | 10/2007 |
| JP | 2009-221514 | 10/2009 |

OTHER PUBLICATIONS

Machine translation of JP 2002-363662 published Dec. 18, 2002.*
Machine translation of JP 2004-002927 published Jan. 8, 2004.*

* cited by examiner

METHOD FOR RECOVERING TANTALUM

BACKGROUND OF THE INVENTION

1. Field of the Invention

The present invention relates to a method for recovering tantalum, and in particular to a technology for effectively recovering tantalum from tantalum-containing waste obtained from printed wiring boards containing tantalum capacitors or from a tantalum sintered compact collected from tantalum capacitors.

2. Description of the Related Art

Tantalum capacitors have high capacity and high stability, and many of them have been used especially for laptop computers, communication devices, large-sized computers and audio equipment and the like. And it is said that as many as about 3.8 billion tantalum capacitors are produced annually in Japan. These tantalum capacitors are distributed to the market with being mounted on various electronic and electric substrates such as printed wiring boards, but used tantalum capacitors are not actively recovered or recycled for economical or technical reasons and merely disposed as industrial waste at present.

Recently due to the problem of resource scarcity, efforts have been underway as a national project to recover and reuse rare metals from electronic and electric devices disposed. It is expected to recover with high efficiency tantalum which is one of the rare metals from waste substrates such as printed wiring boards and used tantalum capacitors.

As a conventional technology for recovering tantalum from tantalum capacitors, for example, a method of recovering tantalum from scrap tantalum by removing a manganese dioxide solid electrolyte, which is a coating material in used tantalum capacitors, by acid leaching, carbon reduction-acid leaching, or chlorination distillation or an argon-hydrogen plasma method and then refining it by a chlorination method, an alkoxide method, an electron beam method or a combination of these is known (see Patent Literature 1).

Also, a method for recovering tantalum comprising heat treating a waste substrate packaged with a tantalum capacitor to 550° C. or higher under an oxidizing atmosphere, and sorting the resulting heated product according to the major axis length is known (Patent Literature 2).

These prior art technologies enable a certain quality level of metal tantalum and tantalum oxide to be recovered from waste substrates and used tantalum capacitors. However, it is said that since tantalum recovered with these technologies contain a large amount of impurities such as silicon (Si), antimony (Sb), phosphorus (P), manganese (Mn), tin (Sn), lead (Pb), zinc (Zn), iron (Fe), nickel (Ni) and copper (Cu), direct reuse is difficult. For example, when designing recycling from waste substrates such as printed wiring boards, a large amount of impurities such as copper wire other than tantalum is inevitably included, and therefore it was difficult to address the problem by prior art technologies as described in Patent Literature 1.

PRIOR ART DOCUMENT

Patent Literature

[Patent Literature 1] Japanese Patent Appl. Laid Open No. 1989-75632
[Patent Literature 2] Japanese Patent Appl. Laid Open No. 2009-221514

DISCLOSURE OF THE INVENTION

Problems to be Solved by the Invention

Under such circumstances, the present invention provides a technology for recovering tantalum from tantalum containing waste effectively, in particular, a technology capable of recovering, with high recovery rates, tantalum from tantalum-containing waste and tantalum sintered compact collected from tantalum capacitors with reducing impurities which hinder reuse, such as antimony (Sb), phosphorus (P), manganese (Mn), tin (Sn), lead (Pb), zinc (Zn), iron (Fe), nickel (Ni) and copper (Cu).

Means for Solving the Problems

To solve the above problem, the present invention provides a method for recovering tantalum from tantalum-containing waste, comprising subjecting tantalum-containing waste to an acid treatment and then to an alkali treatment, thereby recovering tantalum.

The tantalum-containing waste in the present invention is not particularly limited as long as the waste contains tantalum. For example, waste substrates such as printed wiring boards on which a tantalum capacitor is mounted, chip waste obtained via pulverizing such waste substrates and defective products in the production of capacitors are preferred as materials to be recovered. The tantalum-containing waste in the present invention is preferably chip waste prepared by pulverization rather than untreated waste substrates, for the efficiency of the acid treatment and the alkali treatment in the present invention. The tantalum-containing waste in the present invention also includes tantalum sintered compact collected from tantalum capacitors.

In the method for recovering tantalum of the present invention, tantalum-containing waste is subjected to a two-stage wet treatment of an acid treatment and an alkali treatment to recover tantalum with high recovery rates while reducing impurities. The method for recovering tantalum of the present invention is capable of recovering tantalum from tantalum-containing waste in the form of an oxide or a metal.

The acid treatment in the present invention may be performed with use of an acid such as hydrochloric acid, sulfuric acid or nitric acid. The acid treatment enables removal of impurities from tantalum-containing waste, such as antimony (Sb), manganese (Mn), tin (Sn), lead (Pb), zinc (Zn), iron (Fe), nickel (Ni) and copper (Cu). The acid treatment in the present invention is particularly preferably performed with use of an acid containing hydrochloric acid. When hydrochloric acid is used, antimony, manganese, tin, lead, iron, nickel and copper contained in tantalum-containing waste can be easily dissolved and removed. The acid treatment specifically includes bringing a solution containing hydrochloric acid or aqua regia (mixed acid of hydrochloric acid and nitric acid) into contact with tantalum sintered compact.

When tantalum-containing waste contains silver (Ag), such silver can be recovered from filtrate obtained via filtration after the acid treatment in the form of silver chloride. When hydrochloric acid is used in the acid treatment and tantalum-containing waste contains silver, silver (Ag) changes to silver chloride (AgCl). This is due to the reaction with chlorine gas generated when manganese dioxide ($MnO_2$) contained in tantalum-containing waste is dissolved in hydrochloric acid. Part of the resulting silver chloride is dissolved in hydrochloric acid. For silver dissolved in hydrochloric acid, filtration is performed after acid treatment, and when the filtrate is diluted, silver chloride precipitates, and so silver can be recovered by filtering again.

In the method for recovering tantalum of the present invention, an alkali treatment is performed after the above acid treatment, allowing a greater amount of impurities to be removed to recover high-content tantalum. Preferably the alkali treatment in the present invention is performed with use of sodium hydroxide or potassium hydroxide. The alkali treatment can efficiently remove impurity phosphorus (P) and is also capable of removing tin (Sn), lead (Pb), iron (Fe) and nickel (Ni) remaining even after the acid treatment. Although some phosphorus can be removed by the aforementioned acid treatment, it is difficult to remove phosphorus included in tantalum-containing waste only by the acid treatment. Also, while most of tin, lead, iron and nickel can be removed by the acid treatment, small quantities of them may remain in some cases. The alkali treatment using sodium hydroxide or potassium hydroxide in the present invention enables efficient removal of phosphorus included in tantalum-containing waste and also enables reduction of impurities such as tin, lead, iron and nickel. The alkali treatment may be performed, for example, by bringing a sodium hydroxide or potassium hydroxide-containing solution into contact with tantalum-containing waste after the acid treatment. Also, it is preferable to perform a water washing treatment after the acid treatment and then perform the alkali treatment. This is because the water washing treatment is capable of reducing the influence of acid used earlier and enables efficient alkali treatment.

The tantalum-containing waste in the present invention is preferably a tantalum sintered compact collected from tantalum capacitors. This is because in the case of tantalum sintered compact collected from tantalum capacitors, higher-content tantalum can be easily recovered. Tantalum sintered compact inevitably includes structural components of tantalum capacitors such as resin.

When the method for recovering tantalum of the present invention is applied to tantalum sintered compact collected from tantalum capacitors, the target tantalum capacitors include not only used tantalum capacitors but also unused tantalum capacitors. The unused tantalum capacitors mean, for example, defective tantalum capacitors in the production of capacitors that have not been used. Also, types of tantalum capacitors are not particularly limited, and various types may be the target, including metal-cased tantalum capacitors whose outer package is covered with a metal such as Cu or Zn, resin-dipped tantalum capacitors whose outer package is covered with organic resin such as epoxy resin by dipping, resin-molded tantalum capacitors whose outer package is formed by molding using epoxy resin, and chip type tantalum capacitors.

In the method for recovering tantalum of the present invention, methods of collecting tantalum sintered compact from tantalum capacitors are not particularly limited. Tantalum capacitors are composed of various structural materials for their outer packages and electrodes, such as metal and resin, depending on the types, but all types of tantalum capacitors contain a tantalum sintered compact as an essential structural material. Therefore, when applying the present invention, it is desired that structural materials other than tantalum sintered compact, namely, substances contained as impurities, be preliminarily removed from tantalum capacitors so that the tantalum sintered compact is collected in a concentrated form to some extent.

In the present invention, for the method for preparing tantalum-containing waste which is a material to be recovered, or the method for collecting tantalum sintered compact from tantalum capacitors, various known methods may be used, such as a crushing treatment, a pulverizing treatment, a magnetic separation treatment, a gravity separation treatment, a sieving treatment, a roasting treatment, an eddy current separation treatment, an electrostatic separation treatment and a color separation treatment. And these may be used in combination. It is preferable to remove as many impurities as possible from waste substrates such as printed wiring boards on which a tantalum capacitor is mounted by these pretreatments to prepare tantalum-containing waste with concentrated tantalum. It is also preferable to remove as many impurities as possible by these pretreatments even when collecting tantalum sintered compact from tantalum capacitors. Waste substrates such as printed wiring boards having a tantalum capacitor mounted thereon, to which the method for recovering tantalum of the present invention is applied, contain very large amounts of impurity substances such as copper, zinc and aluminum and organic materials such as resin. Therefore, it is desired that before applying the method for recovering tantalum of the present invention, these impurities be removed to a sufficient degree. Likewise, it is desired that copper, zinc and organic materials such as resin be preliminarily removed to a sufficient degree from tantalum sintered compact collected from tantalum capacitors. Also, when tantalum sintered compact is a material to be recovered in the method for recovering tantalum of the present invention, the content of tantalum in the tantalum sintered compact is preferably 50% by weight or more. When the content of tantalum is 50% by weight or more, higher-content tantalum can be easily recovered. Furthermore, the method for recovering tantalum of the present invention is particularly effective for tantalum-containing waste containing any of manganese, antimony and phosphorus.

In the present invention, to remove impurity substances efficiently, first, for example, a crushing treatment is performed as a pretreatment to decompose waste substrates and tantalum capacitors. When crushing tantalum capacitors by this crushing treatment, fine powder containing tantalum may be generated. Thus it is preferable to perform a sieving treatment after the crushing treatment to collect the fine powder and also recover tantalum from the fine powder.

Also, when the outer package of a tantalum capacitor is composed of an organic resin, a method in which a roasting treatment is performed to form powder of the resin, and tantalum sintered compact and the powdered resin are separated by a sieving treatment is also preferable. Preferably roasting conditions include 400 to 500° C. and 1 to 5 hours. When heated more weakly than the roasting conditions, for example, at a lower temperature, resin powdering is likely to be insufficient. At a higher temperature, not only resin but also tantalum sintered compact is likely to be powdered, and therefore it becomes difficult to separate tantalum sintered compact and powdered resin in the subsequent sieving treatment. Conditions of 400° C. to 450° C. for 3 to 5 hours, and higher than 450° C. to 500° C. for 1 to 5 hours are particularly preferred.

Tantalum-containing waste and tantalum sintered compact obtained from waste substrates contain magnetic substances such as iron in the outer package or electrodes as impurities. It is preferable to remove impurities in these magnetic substances by a magnetic separation treatment.

Also, when tantalum sintered compact is a material to be recovered as tantalum-containing waste in the present invention, and tantalum sintered compact and other impurities have a different size and a different specific gravity, a sieving treatment or a gravity separation treatment may be performed to remove impurities other than tantalum sintered compact.

In the case where tantalum sintered compact is a material to be recovered as tantalum-containing waste in the present invention, preferred methods for collecting tantalum sintered compact from tantalum capacitors include, for example, performing a crushing treatment to detach outer package constituent materials from tantalum sintered compact, separating fine powder generated in the crushing treatment via a sieving treatment, removing constituent materials such as Fe via a magnetic separation treatment and then performing a gravity separation treatment to collect tantalum sintered compact. The fine powder separated in the sieving treatment may be subjected to physical treatment such as wet gravity separation, and the method for recovering tantalum of the present invention is applied to the resultant to recover tantalum.

Tantalum recovered by the method for recovering tantalum of the present invention may be concentrated to higher purity tantalum by a solvent extraction method or the like and used for recycling. Since impurities such as Mn, P and Sb which adversely affect the solvent extraction treatment are removed in the method for recovering tantalum of the present invention, high purity tantalum can be obtained via concentrating effectively.

Effect of the Invention

According to the present invention, impurities which hinder reuse can be reduced and high-content tantalum can be effectively recovered from tantalum-containing waste.

MODES FOR CARRYING OUT THE INVENTION

Embodiments of the present invention will be described. The following first embodiment to fifth embodiment describe cases using a used tantalum capacitor as a material to be recovered. The sixth embodiment describes a case using mount devices on a waste substrate (printed wiring board) on which a tantalum capacitor is mounted as a material to be recovered.

Figure 1:
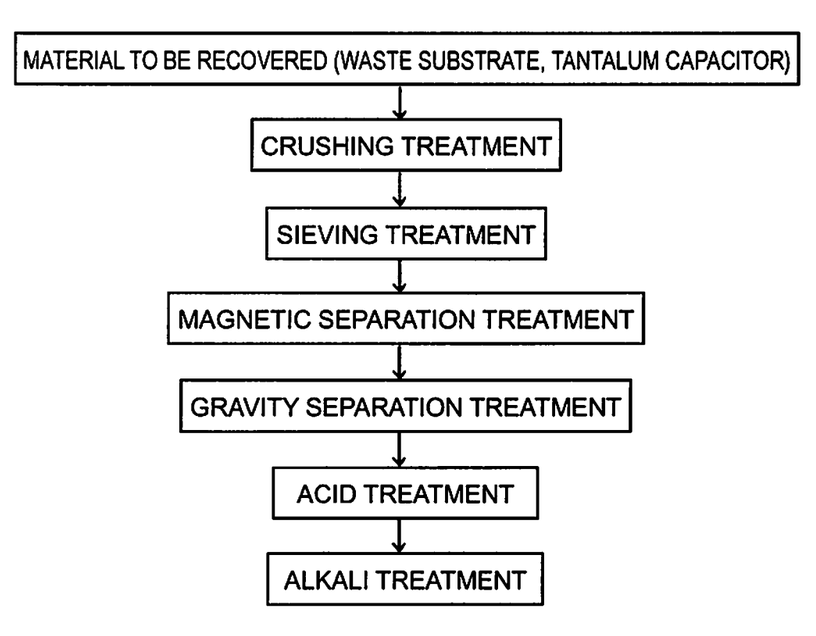
FIG. 1 is a process flow diagram of the present embodiments according to the method for recovering tantalum.

First the process flow shown in FIG. 1 will be outlined in view of the method for recovering tantalum using a used tantalum capacitor or tantalum-containing waste as a material to be recovered according to the first embodiment to the sixth embodiment. The crushing treatment, the sieving treatment and the magnetic separation treatment as described below are only examples and may not be necessary for some materials to be recovered. The application and procedures of these treatments may be changed depending on the material to be recovered.

Crushing Treatment:

First, a tantalum capacitor that is the target for recovering tantalum was subjected to a crushing treatment. In the crushing treatment, a commercially available crusher may be used, and a shear-crushing, cutter mill type crusher is preferably used. This is because the cutter mill type crusher crushes outer packages of capacitors and allows the packages to be easily separated. In the present embodiment the crushing treatment was performed with use of a commercially available plastic crusher (made by YOSHIDA SEISAKUSHO CO., LTD., Model 1005). 2-30 mm large tantalum capacitors were crushed to a size of 0.001 to 2 mm with the crusher.

Sieving Treatment:

After the crushing treatment, a sieving treatment is performed with use of an electromagnetic vibratory sieve shaker (made by Retsch Co., Ltd., AS200). The purpose of this sieving treatment is to separate fine powder and relatively large blocks generated in the crushing treatment. A sieve having a mesh opening of 150 μm was used in the present embodiment.

Magnetic Separation Treatment:

The blocks that remained on the sieve in the sieving treatment are subjected to a separation treatment by magnetic force. The purpose of the magnetic separation treatment is to remove magnetic substances such as iron used in outer packages, electrodes and lead wire of capacitors. A commercially available magnetic separator may be used in this magnetic separation treatment. In the present embodiment, the treatment was performed with use of a drum magnetic separator with a ferrite magnet (made by Magnet Plan Co. Ltd., MDS-250 BDD-HH). The magnetic separation treatment was performed with use of this magnetic separator under condition of a magnetic flux density (drum surface) of about 3000 G and a drum rotation speed of 38 rpm.

Gravity Separation Treatment:

Non-magnetic substances separated in the magnetic separation treatment were subjected to a gravity separation treatment to collect tantalum sintered compact. A commercially available gravity separator may be used in this gravity separation treatment. In the present embodiment, the treatment was performed with use of a gravity separator (made by Harashima Electric Machine Industry Co., Ltd, HH-310) for separating into heavy substances which correspond to tantalum sintered compact and light substances such as resin by wind and vibration. Gravity separation conditions included a frequency of 10 Hz, a wind speed of 1.6 m/s, a slope of 7° and a feed rate of 0.7 kg/min. The substances separated and collected via the gravity separation treatment on the heavy substance side was tantalum sintered compact which is the target to be treated.

Acid Treatment:

The resulting tantalum sintered compact was subjected to an acid treatment with hydrochloric acid.

Alkali Treatment:

After the acid treatment, a water washing treatment was performed and then an alkali treatment was performed with use of a sodium hydroxide solution.

After the alkali treatment the resultant was washed with water and the residue was roasted in the air at 900° C. for 4 hours to recover tantalum oxide ($Ta_2O_5$). The roasting treatment is not essential and tantalum oxide can also be recovered only by a drying treatment.

First Embodiment

The first embodiment describes the results of studying the condition of the acid treatment process shown in the process flow of FIG. 1. Types of acids studied were hydrochloric acid, aqua regia and sulfuric acid.

Herein, to study the acid treatment condition, a resin-dipped tantalum capacitor was used as a used tantalum capacitor. The resin-dipped tantalum capacitor has an outer package formed by dipping in an organic resin such as epoxy resin, in which Fe and Ni are used for the lead wire of the electrode. Organic resin often contains Si, Sb and Br. Table 1 shows the results of analysis of the components of the resin-dipped tantalum capacitor.

TABLE 1

Resin-dipped type

| Component | Content | Unit |
|---|---|---|
| $Ta_2O_5$ | 62.2 | wt % |
| Si | 5.75 | wt % |
| Sb | 0.50 | wt % |
| P | 175 | ppm |
| Mn | 5.58 | wt % |
| Sn | 5.67 | wt % |
| Pb | 3.25 | wt % |
| Zn | 0.05 | wt % |
| Fe | 2.73 | wt % |
| Ni | 0.02 | wt % |
| Cu | 0.88 | wt % |
| Ti | 0.04 | wt % |
| Na | ND | wt % |

(ND: Not detected)

The results of component analysis shown in Table 1 were obtained via the measurement of the components of an analyte tantalum capacitor which was roasted in the air at 900° C. for 4 hours and then pulverized, by inductively coupled plasma emission spectrometry or atomic absorption spectrometry. As Table 1 shows, the resin-dipped type contains large amounts of metals such as Mn, Sn, Pb and Fe, and also considerable amounts of Si and Sb. About 4.0 kg of the used resin-dipped capacitor was prepared and subjected to treatments up to the gravity separation treatment according to the process flow shown in FIG. 1 as a material to be recovered, thereby collecting 1.4 kg of a tantalum sintered compact. The tantalum sintered compact was composed of 79.3% by weight of $Ta_2O_5$, 40 ppm of Sb and 11% by weight of Mn.

A sample (5 g) of the tantalum sintered compact was subjected to an acid treatment under conditions shown in Table 2 (concentration, immersing time, liquid temperature and amount of liquid being changed), and after the acid treatment, the components were analyzed. In the acid treatment with aqua regia (hydrochloric acid:nitric acid=3:1), aqua regia was diluted to be used. In Table 2, the chlorine concentration was 4.5 mol/L in the case of doubling dilution of aqua regia of No. 14, and the chlorine concentration was 2.3 mol/L in the case of quadruple dilution of aqua regia of No. 15.

The remaining amounts shown in Table 2 are the results of semiquantitative determination by X-ray fluorescence analysis of substances prepared by roasting, at 900° C. for 4 hours, a residue obtained via filtering after the acid treatment and the subsequent water washing treatment. For Sb, the amount of Sb removed through the acid treatment was determined by inductively coupled plasma atomic emission spectrometry and converted to the remaining amount. For the evaluation criteria, those in which the effect of removing Sb was found from the Sb remaining amount were ranked as ○ and those in which the Sb remaining amount Sb≤25 ppm were ranked as ⊙.

As Table 2 shows, it has been found that Sb and Mn can be removed by the acid treatment with acid containing hydrochloric acid. The effect of removing Sb was low with a hydrochloric acid concentration of 1 mol/L. The removing effect was likely to be higher at high temperatures rather than at low temperatures, for example, 30° C. An immersing time of 1 hour or longer was fully effective. The results in Table 2 show that the hydrochloric acid concentration is preferably 3 mol/L or more. When the concentration is less than 3 mol/L, the reaction speed is likely to be too low. On the other hand when the concentration is more than 12 mol/L, the cost for the treatment is likely to increase impractically, causing poor handling. Therefore it is considered that the practical upper limit is 12 mol/L. The liquid temperature is preferably 40° C. or above, particularly preferably in the range of 60° C. to 100° C. When the liquid temperature is lower than 40° C., the reaction speed is likely to be too low. When the liquid temperature exceeds 100° C., the solution for the acid treatment is likely to vaporize excessively. The immersing time is preferably 0.5 hour or longer. When the immersing time is shorter than 0.5 hour, it is likely that the reaction does not proceed sufficiently. When the immersing time is longer than 50 hours, the process is less productive, and therefore it is considered that the practical upper limit is 50 hours.

Additionally, for sample No. 10 as shown in Table 2, when hydrochloric acid used in the acid treatment was diluted triply and filtered, white precipitate was obtained. The white precipitate was found to be silver chloride by XRD analysis.

Further, as Table 2 shows, it has been found that Sb and Mn can be removed sufficiently also by the acid treatment with aqua regia.

Also, the acid treatment was performed with use of 3.5 mol/L sulfuric acid (Table 2, No. 13). As a result, it has been found that although sulfuric acid was effective to a certain degree, hydrochloric acid was more preferable.

TABLE 2

| No | Acid | Concentration mol/L | Time hr | Liquid temperature °C. | Liquid amount mL/g | Remaining amount $Ta_2O_5$ wt % | MnO wt % | Sb ppm | Evaluation |
|---|---|---|---|---|---|---|---|---|---|
| 1 | Hydrochloric acid | 1 mol/L | 1 | 90 | 4 | 92.1 | 6.7 | 35.1 | ○ |
| 2 | Hydrochloric acid | 3 mol/L | 1 | 30 | 4 | 90.6 | 8.2 | 34.4 | ○ |
| 3 | Hydrochloric acid | 3 mol/L | 1 | 60 | 4 | 91.7 | 7.9 | 23.6 | ⊙ |
| 4 | Hydrochloric acid | 3 mol/L | 1 | 90 | 2 | 95.2 | 4.5 | 36.1 | ○ |
| 5 | Hydrochloric acid | 3 mol/L | 1 | 90 | 4 | 96.8 | 3.0 | 23.6 | ⊙ |
| 6 | Hydrochloric acid | 3 mol/L | 1 | 90 | 6 | 96.6 | 3.3 | 13.5 | ⊙ |
| 7 | Hydrochloric acid | 3 mol/L | 2 | 90 | 4 | 99.3 | 0.3 | 19.9 | ⊙ |
| 8 | Hydrochloric acid | 3 mol/L | 5 | 90 | 4 | 99.5 | ND | 18.7 | ⊙ |
| 9 | Hydrochloric acid | 6 mol/L | 1 | 90 | 1 | 96.9 | 2.8 | 23.6 | ⊙ |
| 10 | Hydrochloric acid | 6 mol/L | 1 | 90 | 2 | 99.5 | 0.2 | 10.5 | ⊙ |
| 11 | Hydrochloric acid | 6 mol/L | 1 | 90 | 4 | 99.7 | 0.1 | 8.6 | ⊙ |
| 12 | Hydrochloric acid | 6 mol/L | 1 | 90 | 4 | 99.7 | 0.2 | 18.0 | ⊙ |
| 13 | Sulfuric acid | 3.5 mol/L | 1 | 90 | 4 | 88.2 | 8.6 | 30.1 | ○ |
| 14 | Aqua regia | Diluted double | 1 | 90 | 4 | 99.4 | ND | 12.4 | ⊙ |
| 15 | Aqua regia | Diluted quadruply | 1 | 90 | 4 | 95.0 | 4.5 | 32.4 | ○ |

(ND: Not detected)

Second Embodiment

The second embodiment describes the results of studying the condition of the alkali treatment process shown in the process flow of FIG. 1. The types of alkalis studied were sodium hydroxide and potassium hydroxide.

To study the alkali treatment condition, the used resin-dipped capacitor described in the above first embodiment was prepared, and subjected to treatments up to the gravity separation treatment according to the process flow shown in FIG. 1 as a material to be recovered, thereby collecting a tantalum sintered compact. The tantalum sintered compact was subjected to an acid treatment at a hydrochloric acid concentration of 6 mol/L (immersing time 1 hour, liquid temperature 90° C., liquid amount 2 mL/g (mL/g representing liquid amount per 1 g of the tantalum sintered compact)), and the resultant was employed as a sample for the alkali treatment. The sample after the acid treatment was composed of 99.5% by weight of $Ta_2O_5$ and 220 ppm of P.

A sample (5 g) of the tantalum sintered compact was subjected to an alkali treatment under conditions shown in Table 3 (types of alkali, concentration, immersing time, liquid temperature and amount of liquid being changed), and after the treatment, the components were analyzed.

TABLE 3

| No | Type | Concentration wt % | Time hr | Liquid temperature ° C. | Liquid amount mL/g | $Ta_2O_5$ wt % | P ppm | Evaluation |
|----|------|------|-----|-----|---|------|-----|---|
| 101 | NaOH | 5 | 1 | 90 | 4 | 99.7 | 182 | Δ |
| 102 |  | 10 | 1 | 90 | 4 | 98.6 | 13 | ⊚ |
| 103 |  | 10 | 1 | 30 | 4 | 99.8 | 190 | Δ |
| 104 |  | 10 | 1 | 60 | 4 | 99.8 | 167 | Δ |
| 105 |  | 10 | 0.5 | 90 | 2 | 98.6 | 20 | ⊚ |
| 106 |  | 10 | 1 | 90 | 1 | 97.7 | 26 | ⊚ |
| 107 |  | 10 | 1 | 90 | 2 | 98.2 | 20 | ⊚ |
| 108 | KOH | 5 | 1 | 90 | 4 | 99.5 | 206 | Δ |
| 109 |  | 10 | 1 | 90 | 4 | 99.4 | 120 | ○ |

For the evaluation criteria shown in Table 3, those with 60 ppm or less of P were ranked as ⊚, those with 61 to 150 ppm of P were ranked as ○ and those with 151 to 219 ppm of P were ranked as Δ.

As Table 3 shows, it has been found that P can be removed by the alkali treatment using sodium hydroxide or potassium hydroxide. It has been found that particularly when using sodium hydroxide under preferable alkali treatment conditions, P was successfully reduced to 60 ppm or lower.

The results in Table 3 shows that for the condition of the alkali treatment using sodium hydroxide, the concentration of sodium hydroxide is preferably 5% by weight to 15% by weight, particularly preferably 10 to 15% by weight. The immersing time is preferably 0.5 hour or longer, particularly preferably 0.5 hour to 1 hour. It has been found that the liquid temperature is preferably 60° C. or above, particularly preferably 90 to 100° C. When the conditions are not met, P is likely to remain. Also it is likely that the longer the alkali treatment time, the more Na is mixed in tantalum recovered.

The third to fifth embodiments describe the results of recovering tantalum oxide from various used tantalum capacitors according to the above process flow of FIG. 1.

Third Embodiment

In the third embodiment, a resin-dipped tantalum capacitor similar to that in the above first embodiment was used as a used tantalum capacitor. The components of the resin-dipped tantalum capacitor are shown in Table 1.

About 4.0 kg of the used resin-dipped capacitor was prepared and subjected to treatments up to the gravity separation treatment according to the process flow shown in FIG. 1 as a material to be recovered, thereby collecting 1.4 kg of a tantalum sintered compact.

The resulting tantalum sintered compact was immersed in a 6 mol/L hydrochloric acid solution (liquid temperature 100° C.) for 1 hour to perform the acid treatment. Then, the tantalum sintered compact was removed from the hydrochloric acid solution and washed with water. The water-washed tantalum sintered compact was immersed in a 10% by weight sodium hydroxide solution (liquid temperature 90° C.) for 1 hour to perform the alkali treatment. After the alkali treatment, the resultant was washed with water and filtered, and the residue was roasted in the air at 900° C. for 4 hours and recovered as tantalum oxide ($Ta_2O_5$). For the above procedure for recovering tantalum oxide ($Ta_2O_5$) from the used resin-dipped tantalum capacitor, the results of analysis of the components after completion of the respective processes of the gravity separation treatment, the acid treatment and the alkali treatment (substance recovered after roasting) are shown in Table 4.

TABLE 4

| Component |  | Gravity separation | Acid treatment | Alkali treatment |
|---|---|---|---|---|
| $Ta_2O_5$ | wt % | 82.6 | 99.8 | 98.8 |
| Si | ppm | <100 | <100 | <100 |
| Sb | ppm | 20 | <10 | <10 |
| P | ppm | 160 | 180 | 20 |
| Mn | wt % | 7.9 | 590 (ppm) | 600 (ppm) |
| Sn | wt % | 0.23 | 60 (ppm) | 20 (ppm) |
| Pb | wt % | 0.34 | 70 ppm | 20 (ppm) |
| Zn | ppm | 10 | <10 | <10 |
| Fe | ppm | 50 | 20 | 10 |
| Ni | ppm | <10 | <10 | <10 |
| Cu | ppm | 280 | <10 | <10 |
| Ti | ppm | <10 | <10 | <10 |
| Na | ppm | 20 | <10 | 1.1 (wt %) |
| Tantalum recovery rate | % | 100 | 99.9 | 97.0 |

In the component analysis shown in Table 4, the components other than tantalum oxide ($Ta_2O_5$) were analyzed with X-ray fluorescence analysis and inductively coupled plasma atomic emission spectrometry or atomic absorption spectrometry. Specifically, in the case of components Sb and P, the analytes were dissolved with use of hydrofluoric acid (HF) and then determined by an inductively coupled plasma-atomic emission spectrometer or an atomic absorption spectrometer. The values of the component analysis of $Ta_2O_5$, Sb and Mn after the gravity separation in Table 4 are different from the values of the component analysis in the above first embodiment (paragraph 0039), because a different resin-dipped tantalum capacitor from that of the first embodiment was prepared and used in the third embodiment.

Further, in Table 4, the resulting analytical values of tantalum oxide after completion of the processes of the acid treatment and the alkali treatment are calculated by quantitative analysis of Si, Sb, P, Mn, Sn, Pb, Zn, Fe, Ni, Cu, Ti and Na shown in Table 1 which was detected as impurity elements and also Mo, W, Ca, K and B, and subtracting the total of the quantitative analysis values from 100% by weight. In the calculation, analytical values of Si, Sb, Mn, Sn, Pb, Fe and Cu were converted in terms of oxide of $SiO_2$, $SbO_2$, $MnO_2$, $SnO_2$, PbO, $Fe_2O_3$ and CuO, respectively. Also the analytical value of tantalum oxide after completion of the gravity separation treatment process was obtained via inductively coupled plasma-atomic emission spectrometry. For the tantalum recovery rate (%), the weight of tantalum in the tantalum sintered compact after the respective treatments and the weight of tantalum in the tantalum sintered compact before the respective treatments were examined, and the rate was calculated by the weight of tantalum after the treatments/the weight of tantalum before the treatments×100. For the analytical values, the same applies to the following fourth and fifth embodiments.

As Table 4 shows, although almost all of Si was removed from the tantalum sintered compact obtained via the treatments up to the gravity separation, the compact contained Mn, Fe, Sb and P. And large amounts of Mn and Sb were removed via the acid treatment. Also a large amount of P was removed via the alkali treatment. As a result, tantalum oxide ($Ta_2O_5$) having a content of 98% by weight or more was successfully recovered from the used resin-dipped tantalum capacitor and impurities Sb and P, which particularly cause problems, were successfully reduced to 10 ppm or less and 60 ppm or less, respectively.

Fourth Embodiment

In the fourth embodiment, a resin-molded tantalum capacitor was used as a used tantalum capacitor. The outer package of the resin-molded tantalum capacitor is formed by molding using epoxy resin, and Fe, Ni and Cu are used for the electrode terminal. Table 5 shows the results of analysis of the components of the resin-molded tantalum capacitor.

TABLE 5

| | Resin-molded type | |
| --- | --- | --- |
| Element | Content | Unit |
| $Ta_2O_5$ | 35.60 | wt % |
| Si | 22.44 | wt % |
| Sb | 1.77 | wt % |
| P | 175 | ppm |
| Mn | 4.65 | wt % |
| Sn | 0.79 | wt % |
| Pb | 3.25 | wt % |
| Zn | 0.05 | ppm |
| Fe | 2.73 | wt % |
| Ni | 0.02 | wt % |
| Cu | 0.88 | wt % |
| Ti | 0.04 | ppm |
| Na | 60 | ppm |

As Table 5 shows, the resin-molded type also contains large amounts of metals such as Mn, Sn, Pb and Fe and considerable amounts of Si and Sb. About 3.3 kg of the used resin-molded tantalum capacitor was prepared and subjected to treatments up to the gravity separation treatment according to the process flow shown in FIG. 1 as a material to be recovered, thereby collecting 0.7 kg of a tantalum sintered compact.

In the same manner as the above third embodiment, the resulting tantalum sintered compact was immersed in a 6 mol/L hydrochloric acid solution (liquid temperature 100° C.) for 1 hour to perform the acid treatment. Then, the tantalum sintered compact was removed from the hydrochloric acid solution and washed with water. The water-washed tantalum sintered compact was immersed in a 10% by weight sodium hydroxide solution (liquid temperature 90° C.) for 1 hour to perform the alkali treatment. After the alkali treatment, the resultant was washed with water and filtered, and the residue was roasted in the air at 900° C. for 4 hours and recovered as tantalum oxide ($Ta_2O_5$). For the above procedure for recovering tantalum oxide ($Ta_2O_5$) from the used resin-molded tantalum capacitor, the results of analysis of the components after completion of the respective processes of the gravity separation treatment, the acid treatment and the alkali treatment (substance recovered after roasting) are shown in Table 6.

TABLE 6

| Element | | Gravity separation | Acid treatment | Alkali treatment |
| --- | --- | --- | --- | --- |
| $Ta_2O_5$ | wt % | 80.3 | 99.5 | 97.0 |
| Si | ppm | 450 | <100 | <100 |
| Sb | ppm | 20 | <10 | <10 |
| P | ppm | 470 | 530 | 60 |
| Mn | wt % | 9.90 | 0.28 | 0.30 |
| Sn | ppm | 980 | 30 | <10 |
| Pb | ppm | 910 | 60 | 20 |
| Zn | ppm | 40 | <10 | <10 |
| Fe | ppm | 70 | 30 | 20 |
| Ni | ppm | 150 | 10 | <10 |
| Cu | ppm | 0.11 (wt %) | <10 | <10 |
| Ti | ppm | <10 | <10 | <10 |
| Na | ppm | 20 | <10 | 2.5 (wt %) |
| Tantalum recovery rate | % | 100 | 99.9 | 99.9 |

As Table 6 shows, although a considerable amount of Si was removed from the tantalum sintered compact obtained via the treatments up to the gravity separation, the compact contained Mn, Fe, Sb and P. And large amounts of Mn and Sb were removed via the acid treatment. Also a large amount of P was removed via the alkali treatment. As a result, tantalum oxide ($Ta_2O_5$) having a content of 97% by weight or more was successfully recovered from the used resin-molded tantalum capacitor and impurities Sb and P, which cause problems, were successfully reduced to 10 ppm or less and 60 ppm or less, respectively.

Fifth Embodiment

In the fifth embodiment, a metal-cased tantalum capacitor was used as a used tantalum capacitor. The metal-cased tantalum capacitor has a metal case that covers the outer package with a metal such as Cu and Zn, and Fe, Ni, Sn and Pb are used as the lead wire of the electrode. Table 7 shows the results of analysis of the components of the metal-cased tantalum capacitor.

TABLE 7

Metal-cased type

| Element | Content | Unit |
|---|---|---|
| $Ta_2O_5$ | 45.50 | wt % |
| Si | 0.01 | wt % |
| Sb | ND | wt % |
| P | 100 | ppm |
| Mn | 3.64 | wt % |
| Sn | 13.70 | wt % |
| Pb | 9.65 | wt % |
| Zn | 6.35 | wt % |
| Fe | 4.83 | wt % |
| Ni | 0.39 | wt % |
| Cu | 4.95 | wt % |
| Ti | ND | wt % |
| Na | ND | wt % |

(ND: Not detected)

As Table 7 shows, the metal-cased type contained little Si or Sb because little organic resin was used. However, in addition to Mn, Sn, Pb and Fe, the metal-cased type contained considerable amounts of Cu and Zn. About 6.2 kg of the used metal-cased tantalum capacitor was prepared and subjected to treatments up to the gravity separation treatment according to the process flow shown in FIG. 1 as a material to be recovered, thereby collecting 0.4 kg of a tantalum sintered compact.

In the same manner as the third embodiment, the resulting tantalum sintered compact was immersed in a 6 mol/L hydrochloric acid solution (liquid temperature 100° C.) for 1 hour to perform the acid treatment. Then, the tantalum sintered compact was removed from the hydrochloric acid solution and washed with water. The water-washed tantalum sintered compact was immersed in a 10% by weight sodium hydroxide solution (liquid temperature 90° C.) for 1 hour to perform the alkali treatment. After the alkali treatment, the resultant was washed with water and filtered, and the residue was roasted in the air at 900° C. for 4 hours and recovered as tantalum oxide ($Ta_2O_5$). For the above procedure for recovering tantalum oxide ($Ta_2O_5$) from the used metal-cased tantalum capacitor, the results of analysis of the components after completion of the respective processes of the gravity separation treatment, the acid treatment and the alkali treatment (substance recovered after roasting) are shown in Table 8.

TABLE 8

| Element | | Gravity separation | Acid treatment | Alkali treatment |
|---|---|---|---|---|
| $Ta_2O_5$ | wt % | 79.2 | 99.9 | 99.5 |
| Si | ppm | <100 | <100 | <100 |
| Sb | ppm | 20 | <10 | <10 |
| P | ppm | 180 | 200 | 60 |
| Mn | wt % | 5.3 | 80 (ppm) | 60 (ppm) |
| Sn | wt % | 0.2 | 290 (ppm) | 80 (ppm) |
| Pb | wt % | 0.79 | 70 (ppm) | 210 (ppm) |
| Zn | wt % | 0.31 | <10 | <10 |
| Fe | ppm | 30 | 10 | 10 |
| Ni | ppm | 60 | <10 | <10 |
| Cu | wt % | 0.56 | 210 (ppm) | 180 (ppm) |
| Ti | ppm | <10 | <10 | <10 |
| Na | ppm | <10 | <10 | 0.45 (wt %) |
| Tantalum recovery rate | % | 100 | 99.9 | 99.9 |

As Table 8 shows, the tantalum sintered compact obtained via the treatments up to the gravity separation contained Mn, Fe and P. And Mn was removed via the acid treatment. Also a large amount of P was removed via the alkali treatment. As a result, tantalum oxide ($Ta_2O_5$) having a content of 99% by weight or more was successfully recovered from the used metal-cased tantalum capacitor and impurities Sb and P, which particularly cause problems, were successfully reduced to 10 ppm or less and 60 ppm or less, respectively.

The results in the above third to fifth embodiments proved that the material to be recovered in the method for recovering tantalum of the present invention is preferably tantalum capacitors containing at least one of Mn, Fe, P and Sb. More specifically, the content of Mn and Fe in the material to be recovered is 15% by weight or less and the content of P and Sb is 1% by weight or less.

Sixth Embodiment

In the sixth embodiment, mount devices on a printed wiring board (waste substrate) on which a tantalum capacitor is mounted were used as the material to be recovered. For the mount devices, the content of the tantalum capacitor was concentrated to about 40% by subjecting a printed wiring board on which a tantalum capacitor was mounted to various physical separation treatments such as crushing treatment. The mount devices contained copper wire, IC chips, connectors and various metal pieces in addition to the tantalum capacitor. Table 9 shows the results of analysis of the components of the mount devices.

TABLE 9

Surface-mounted components

| Element | Content | Unit |
|---|---|---|
| $Ta_2O_5$ | 12.30 | wt % |
| Si | 31.23 | wt % |
| Sb | 0.87 | wt % |
| P | 218 | ppm |
| Mn | 2.21 | wt % |
| Sn | 0.66 | wt % |
| Pb | 0.56 | wt % |
| Zn | 0.29 | wt % |
| Fe | 1.95 | wt % |
| Ni | 0.43 | wt % |
| Cu | 7.65 | wt % |
| Ti | 0.37 | wt % |
| Na | ND | wt % |

(ND: Not detected)

As Table 9 shows, the surface-mounted components contained large amounts of Si, Cu, Mn and Sb. Also, the content of tantalum was lower than that of those shown in the above first to fifth Embodiments.

0.6 kg of mount devices obtained from waste substrates were subjected to treatments up to the gravity separation treatment according to the process flow shown in FIG. 1, thereby collecting 0.15 kg of a tantalum sintered compact. The resulting tantalum sintered compact was immersed in a 6 mol/L hydrochloric acid solution (liquid temperature 100° C.) for 1 hour to perform the acid treatment. Then, the tantalum sintered compact was removed from the hydrochloric acid solution and washed with water. The water-washed tantalum sintered compact was immersed in a 10% by weight sodium hydroxide solution (liquid temperature 90° C.) for 1 hour to perform the alkali treatment. After the alkali treatment, the resultant was washed with water and filtered, and the residue was roasted in the air at 900° C. for 4 hours and recovered as tantalum oxide ($Ta_2O_5$). For the above procedure for recovering tantalum oxide ($Ta_2O_5$) from the tantalum sintered compact, the results of analysis of the components $Ta_2O_5$, Cu and Cl after completion of the respective processes of the gravity separation treatment, the acid treatment and the alkali treatment (substance recovered after roasting) are shown.

TABLE 10

| Element | | Gravity separation | Acid treatment | Alkali treatment |
|---|---|---|---|---|
| $Ta_2O_5$ | wt % | 66.6 | 93.7 | 94.9 |
| Cu | wt % | 11.0 | 4.1 | 2.1 |
| Cl | wt % | ND | 0.2 | 0.001 |
| Tantalum recovery rate | % | 100 | 85.8 | 75.1 |

(ND: Not detected)

As Table 10 shows, when surface-mounted components on waste substrates containing low-content tantalum were a material to be recovered, tantalum oxide having a high content of 90% by weight or more was successfully recovered. Also it has been found that when surface-mounted components on waste substrates were a material to be recovered, wiring materials such as Cu were inevitably included and Cu was converted to copper chloride via the acid treatment with hydrochloric acid, and although the content was not tolerable as impurities, the content of the impurity Cu could be reduced in half by the subsequent alkali treatment.

INDUSTRIAL APPLICABILITY

According to the present invention, it is possible to recover tantalum from tantalum-containing waste with high recovery rates. In particular, since the present invention is capable of removing impurities which can easily cause problems in the reuse to tantalum capacitors, such as silicon (Si), antimony (Sb), phosphorus (P), manganese (Mn), tin (Sn), lead (Pb), zinc (Zn), iron (Fe), nickel (Ni) and copper (Cu), the present invention contributes greatly to promotion of resources recycling activities. Also, tantalum recovered by the present invention can be used for purification treatment such as solvent extraction so as to obtain higher purity tantalum.

What is claimed is:

1. A method for recovering tantalum from tantalum-containing waste, comprising subjecting tantalum-containing waste to an acid treatment and then to an alkali treatment, thereby recovering tantalum wherein the tantalum-containing waste is a tantalum sintered compact collected from a tantalum capacitor.

2. The method for recovering tantalum according to claim 1, wherein the acid treatment is performed with use of an acid containing hydrochloric acid.

3. The method for recovering tantalum according to claim 2, wherein the alkali treatment is performed with use of sodium hydroxide or potassium hydroxide.

4. The method for recovering tantalum according to claim 3, wherein the tantalum-containing waste additionally contains one or more components selected from the group consisting of manganese, antimony and phosphorus.

5. The method for recovering tantalum according to claim 2, wherein the tantalum-containing waste additionally contains one or more components selected from the group consisting of manganese, antimony and phosphorus.

6. The method for recovering tantalum according to claim 2, wherein the content of tantalum in the tantalum sintered compact is 50% by weight or more.

7. The method for recovering tantalum according to claim 1, wherein the alkali treatment is performed with use of sodium hydroxide or potassium hydroxide.

8. The method for recovering tantalum according to claim 7, wherein the tantalum-containing waste additionally contains one or more components selected from the group consisting of manganese, antimony and phosphorus.

9. The method for recovering tantalum according to claim 1, wherein the content of tantalum in the tantalum sintered compact is 50% by weight or more.

10. The method for recovering tantalum according to claim 9, wherein the tantalum-containing waste additionally contains one or more components selected from the group consisting of manganese, antimony and phosphorus.

11. The method for recovering tantalum according to claim 1, wherein the tantalum-containing waste additionally contains one or more components selected from the group consisting of manganese, antimony and phosphorus.

* * * * *